United States Patent [19]
Liang

[11] Patent Number: 5,393,424
[45] Date of Patent: Feb. 28, 1995

[54] MUD DEHYDRATING SYSTEM

[76] Inventor: Chih-Hsi Liang, No. 210-3, Shang Lun Tzu, Shang Lun Village, Jen Te Hsiang, Tainan Hsien, Taiwan, Prov. of China

[21] Appl. No.: 115,106

[22] Filed: Sep. 2, 1993

[51] Int. Cl.⁶ .............................................. B01D 33/04
[52] U.S. Cl. ............................. 210/401; 134/181; 134/199; 210/350; 210/355; 210/409
[58] Field of Search ............... 210/350, 355, 409, 401; 134/181, 172, 199

[56] References Cited

U.S. PATENT DOCUMENTS

| | | | |
|---|---|---|---|
| 3,825,125 | 7/1974 | Peterson et al. | 210/401 |
| 4,107,042 | 8/1978 | Heinrich et al. | 210/231 |
| 4,325,396 | 4/1982 | Gehrmann | 210/230 |
| 4,517,087 | 5/1985 | Nagase et al. | 210/401 |
| 4,581,138 | 4/1986 | Kurita et al. | 210/230 |
| 4,624,785 | 11/1986 | Drori | 210/355 |
| 4,659,465 | 4/1987 | Makinoda | 210/230 |
| 4,826,607 | 5/1989 | Pearce | 210/231 |
| 4,882,049 | 11/1989 | Davis | 210/230 |
| 4,917,009 | 4/1990 | Edo | 210/400 |
| 4,944,870 | 7/1990 | Yagishita et al. | 210/400 |
| 5,045,186 | 9/1991 | Takashima | 210/230 |

*Primary Examiner*—Virginia Manoharan
*Attorney, Agent, or Firm*—Morton J. Rosenberg; David I. Klein

[57] ABSTRACT

A mud dehydrating system is provided. The system includes a table, a centrifugal dehydrating cylinder, endless upper and lower filter cloths, compressing rollers, and a cleaning and washing unit in combination. The cleaning and washing unit has swingable nozzles to spray a strong stream of water on the filter cloths. The cloths are pulled tight by tensioning rollers. Two front compressing rollers have long annular recesses formed therein, into which the filter cloths fit for increasing the mud mass to be compressed for dehydrating and preventing the mud mass from leaking out from the sides of the cloths. The tensioning rollers are moved by a pressure augmenting unit for maintaining a stable pulling force on the tensioning rollers to pull the filter cloths stably for a long period of time.

2 Claims, 6 Drawing Sheets

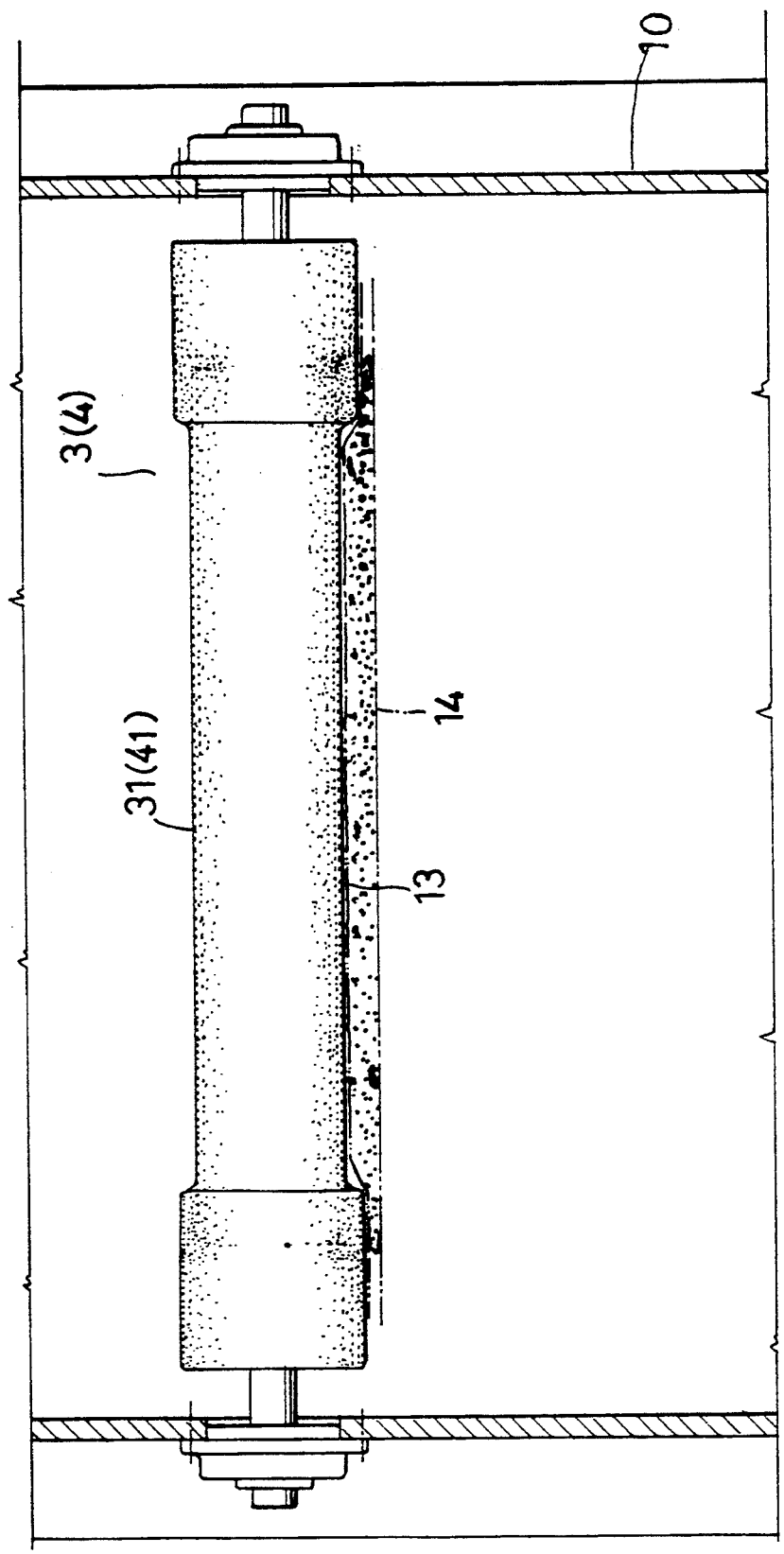

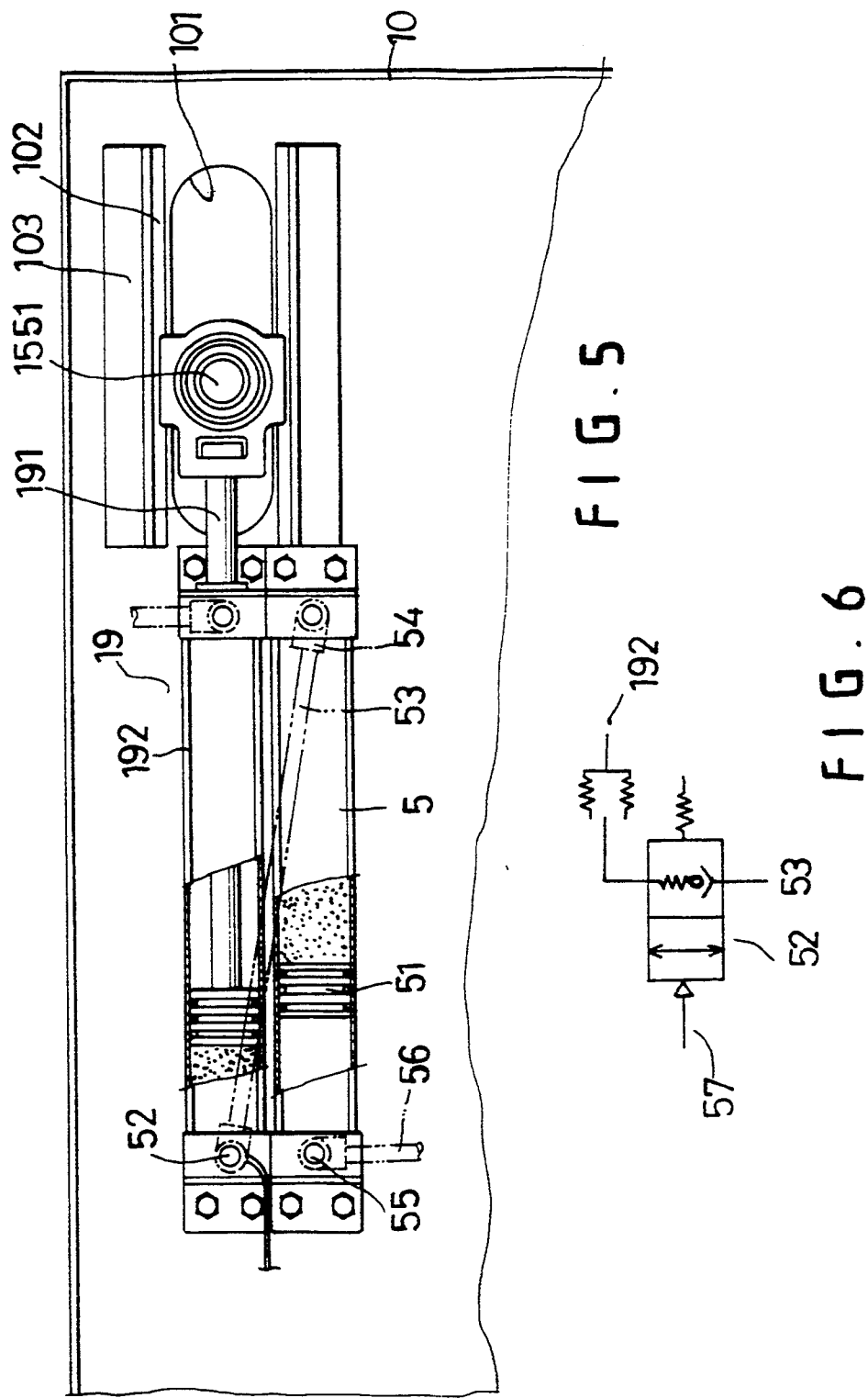

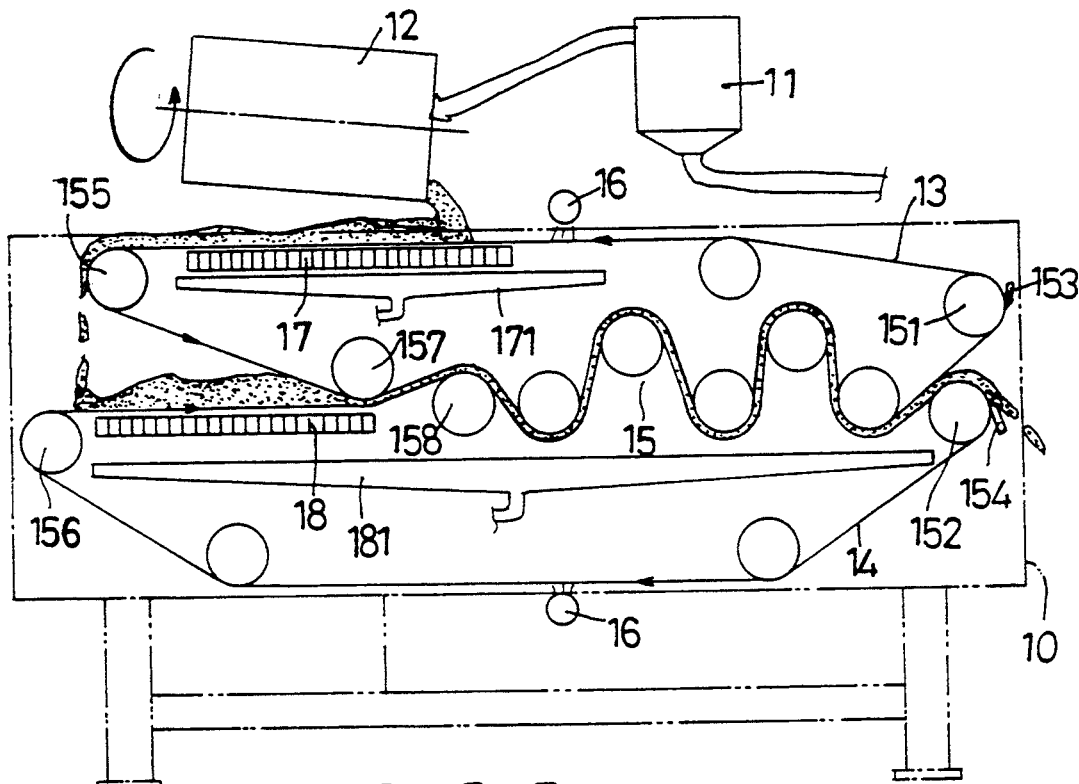
FIG. 7
(PRIOR ART)
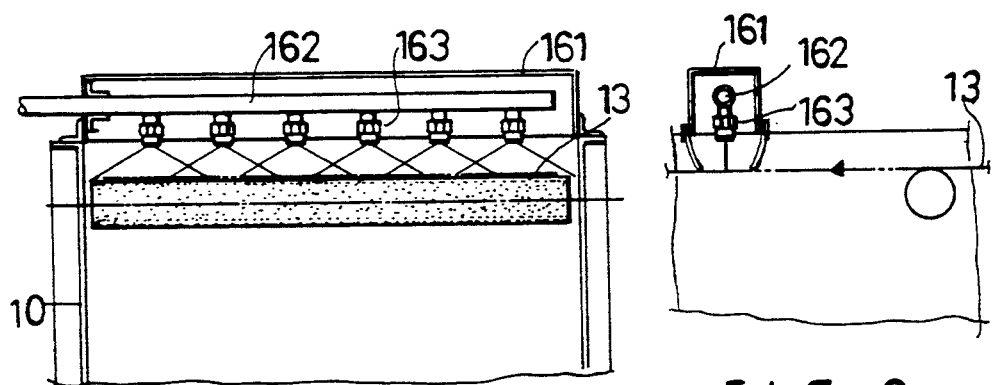
FIG. 8
(PRIOR ART)
FIG. 9
(PRIOR ART)

MUD DEHYDRATING SYSTEM

BACKGROUND OF THE INVENTION

Industrial waste water is one of the most serious environmental pollutants. It is therefore absolutely necessary to properly treat it, getting rid of toxic substances therein and then separating water from mud, the water to be drained into a river or the like. The dehydrated mud block must then be properly discarded or disposed of.

A mud dehydrating system is used to separate water from mud in treated industrial dense waste water, and a conventional one is shown in FIG. 7. The conventional dehydrator includes a mud treating tank 11, a centrifugal dehydrating cylinder 12, an endless circulating upper and a lower filter cloth 13, 14, a compressing roller unit 15 and a filter cloth cleaning and washing unit 16 as main components.

The mud treating tank 11 receives waste water mixed with mud from a condensing pool and into which a chemical is added to mix evenly with the waste water with mud. Then the treated waste water with mud is moved into the centrifugal dehydrating cylinder 12, wherein free water in an upper layer of the waste water is removed, and a jelly-like mud sinks to the bottom and then drops down onto the upper filter cloths 13 moving on the first stage grid gravitational dehydrating section 17 so that water dripping down from the upper filter cloths 13 falls down through the grip section 17 and is collected for recycling. After that, the mud mass on the upper filter cloths 13 is gradually moved and falls down on the lower filter cloth 14 moving on a second grid gravitational dehydrating section 18 to be dehydrated gravitationally for the second time. Then the mud mass on the lower filter cloth 14 gradually moves to be pinched between the upper and the lower filter cloths 13, 14 and to be compressed and squeezed by a plurality of compressing rollers of a compressing roller unit 15, releasing water contained therein. And finally, the mud mass becomes a mud block of a certain thickness with little moisture, and is removed at two transmitting rollers 151, 152 by two knives, one upper 153 and one lower 154. The mud blocks fall down to a collection section to be transported for discarding. Meanwhile, the water freed from the waste is collected in an upper and a lower plate 171, 181 and then recycled to be used for the cleaning and washing unit 16 or drained into a river.

The cleaning and washing unit 16 shown in FIGS. 8 and 9 includes a projecting cover 161 on the table 10, a water inlet tube 162 inside the cover 161, and a plurality of nozzles 163 connected under the tube 162, each nozzle 163 having a straight slot mouth for spraying out a fan-shaped water curtain to wash the slow-moving upper and lower filter cloth 13, 14 to clean any mud dregs stuck on the cloths. Then the endless filter cloths 13, 14 can be repeatedly used for conveying the mud mass to be compressed and squeezed by the compression roller unit 15.

More than 12 nozzles 163 have to be provided in the cleaning and washing unit 16 to spray the fan-shaped water curtain, with each one fixed at 15 mm intervals. The washing unit consumes about 32 tons of water for 8 hours' operation of this unit, resulting in a heavy cost for a user.

The plurality of compressing rollers and the upper and the lower filter cloths 13, 14 play an important role in dehydrating a large part of water from the mud, which can become mud blocks containing little moisture. How the mud mass comes out of the second gravitational dehydrating section 18, enters the compressing roller unit 15, the entering quantity of mud, and the spreading of the mud mass is especially important. These characteristics are related to the shape of the front two rollers 157, 158 of the compressing roller unit 15 and the moving tension of the filter cloths 13, 14. The necessary tension of the cloths are given by the tension rollers 155, 156, so the shape of the rollers 155, 156 is comparatively important. As shown in FIG. 10, when a large mud mass begins to enter the space between the upper and the lower filter cloth 13, 14, it is pushed by the first roller to become gradually wide and flat; if the mud mass is too large, it can partly leak out from both sides of the cloths 13, 14. The two cloths 13, 14 have to be adjusted in tension by moving the tension rollers 155, 156 so as to squeeze out water from the mud mass.

How the tension rollers 155, 156 are to be moved is to be described as follows. As shown in FIGS. 11, 12, a long oval hole 101 is respectively provided in both side portions of the table 10, two angle irons 103, 103 with guide rails 102, 102 are fixed at both sides of each hole 101, a movable bearing 104 is provided between the two rails 102, 102, and a rack 105 is provided in the inside of the table 10. The tension roller 155 has a shaft 1551 pivotally combined with the bearing 104, a gear 1553 is provided to engage the rack 105, and one end of the movable bearing 104 is fixed to an end of a shaft 191 of a pressure augmenting unit 19 so that the two ends of the shaft of the tension roller 155 can be moved by the pressure augmenting unit 19 to pull the filter cloth 13 or 14 to a proper tension.

Here we are going to make an inquiry into the relationship between the pressure augmenting unit 19 and the filter cloths 13, 14. As mentioned above, the tension rollers 155, 156 are displaced to pull the upper and the lower filter cloths 13, 14 to a proper tension to force the mud mass to dehydrate. The pressure augmenting unit 19 may include an oil or air cylinder. However, an oil cylinder is generally expensive, and has a high failure rate, and liable to get dirty in its work location. In addition, oil cylinders have a large output because of the incompressibility of the oil as mobile medium, which is hard to adjust to provide a small force. Such circumstances result in shorter service life for the filter cloths 13, 14.

If an air cylinder is used for the pressure augmenting unit 19, its output is adjustable. However, air as mobile medium has a characteristic of compressibility. Using air, the filter cloths 13, 14 may gradually grow slack after long hours of operation because of the weight and dimensions of the mud mass. This will result in the mud mass blocks produced gradually containing more and more moisture. Also, the upper and the lower filter cloths 13, 14 may move too near to and rub both inner sides of the table 10, and then become damaged or suddenly break, if their tension is not proper.

SUMMARY OF THE INVENTION

This invention has been devised to offer an improved mud dehydrating system for treating industrial waste water.

One of the purposes of this invention is to offer an improved cleaning and washing unit in the system, in which two nozzles are connected to a highly pressurized water source and swingable by means of a movable disc, a pivotal shaft, a swinging block and a motor with a speed reducer combined together so that the nozzles can spray out strong string-like water for shooting through the meshes of two belt-like endless circulating filter cloths, moving back and forth for a certain angle to wash the filter cloths, and consuming only about 1/12 of water volume consumed by a conventional mud dehydrating system.

Another purpose is to offer an improved compressing roller unit in the mud dehydrating system, which includes a first and a second roller provided with a long annular recess for the mud mass entering the space between the rollers and the filter cloths to increase quantity of the mud mass to be compressed and squeezed without leaking out of both sides of the filter cloths.

Still another purpose is to offer an improved pressure augmenting unit for the tension rollers in the mud dehydrating system, which includes a second air cylinder connected in series with a first air cylinder by means of check valve so that the first air cylinder pushes its piston rod with incompressible oil to push the tension rollers, which are then given a stable proper force to pull the filter cloths so as to obtain long service life for the cloths.

BRIEF DESCRIPTION OF THE DRAWINGS

The invention will be better understood by reference to the accompanying drawings, wherein:

FIG. 4 is a front view of a first roller and an upper and a lower filter cloth in the mud dehydrating system in the present invention;

FIG. 5 is a cross-sectional view of a pressure augmenting unit combined with a tension roller in the mud dehydrating system in the present invention;

FIG. 6 is a diagram of a check valve in the pressure augmenting system of the tension roller in the mud dehydrating system in the present invention;

FIG. 7 is a diagrammatic view of operation of a conventional mud dehydrating system;

FIG. 8 is a front view of a cleaning and washing unit in the conventional mud dehydrating system;

FIG. 9 is a side view of the cleaning and washing unit in the conventional mud dehydrating system;

DESCRIPTION OF THE PREFERRED EMBODIMENTS

Figure 1:
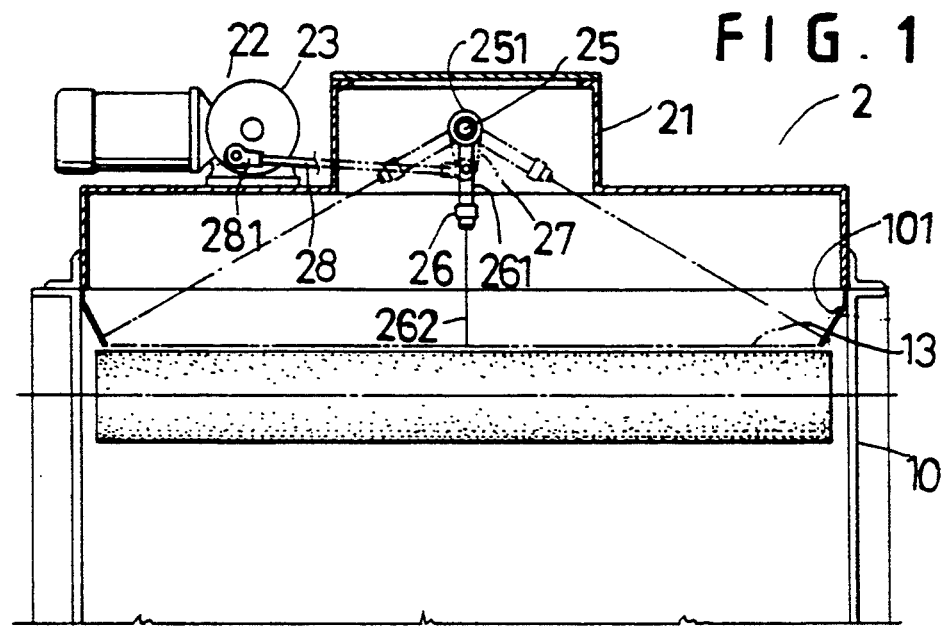
FIG. 1 is a front cross-sectional view of a mud dehydrating system in the present invention.
Figure 2:
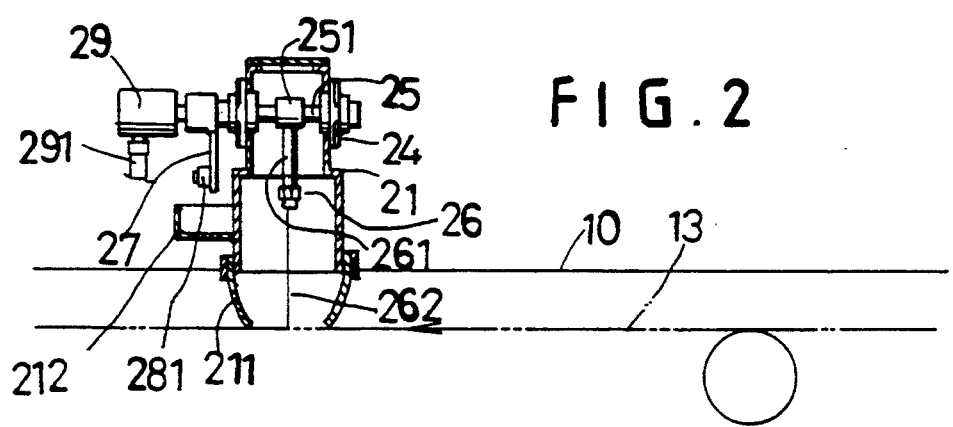
FIG. 2 is a side cross-sectional view of a projecting cover and a nozzle with related components in the mud dehydrating system in the present invention.

A mud dehydrating system of the present invention, as shown in FIGS. I and 2, includes a cleaning and washing unit 2, which has a projecting cover 21 on a table 10, a motor 22 with a speed reducer, a soft belt 211 at a lower portion of the cover 21, a water trough 212 on an outer side of the cover 2 and two stopping plates 101, 101 extending in the table 10 at two opposite sides thereof. The motor 22 has a shaft coupled to a movable disc 23. A hollow shaft 25 is supported by a bearing unit 24 in an upper portion of the cover, the hollow shaft 25 having a sleeve 251 disposed inside the cover 21 connected with a tube 261, the tube 261 being connected with a nozzle 26 which can spray out a strong string-like stream of water. A swing block 27 is fixed on the hollow shaft 25 outside of the cover 21. A connecting rod 28 having two ends combined with ball links 281, 281, one end eccentrically coupled to the disc 23 and the opposing end coupled to the swing block 27, forming a crank and a connecting rod structure. The spray nozzle 26 thereby being swung through a preset angle by the swing block 27 combined with the motor 22.

The hollow shaft 25 has one end secured to a rotating joint 29 which is connected with a tube 291, the tube 291 being connected to a high pressure pump, forming a water passageway through the rotating joint 29, the shaft 25 and the nozzle 26 to supply high pressurized water to the nozzle 26.

When the motor 22 is started, the disc 23 is rotated to move the swing block 27 and the shaft 25 through a preset angle, and accordingly the nozzle 26 also swings for a preset angle to spray water to wash any mud dregs stuck in the mesh of the filter cloth 13 or 14.

In order to understand clearly the operation and the effectiveness of the cleaning and washing unit 2, data obtained from practical operation is referred to for example, a filter cloth of 800 mm wide is washed by the two nozzles 26, 26 of the cleaning and washing unit 2. Water sprayed out of each nozzle 26 has a pressure 20 kg/cm, supplied by the high pressure pump, the water volume thereby consumed is 5.7 kg/m. So two nozzles 26, 26 consume 2.6 ton for 8 hours of operation per day, which is an extremely small quantity when compared with 32 tons consumed by the conventional mud dehydrating system. The recycled water in this mud dehydrating system will be enough for its use, providing further cost savings for water. In addition, the water pressure, 20 kg/cm, combined with swinging of the nozzle can obtain a tremendously better effect in cleaning than the conventional system using 4 kg/cm pressure with a stationary water curtain-style spraying method.

Figure 3:
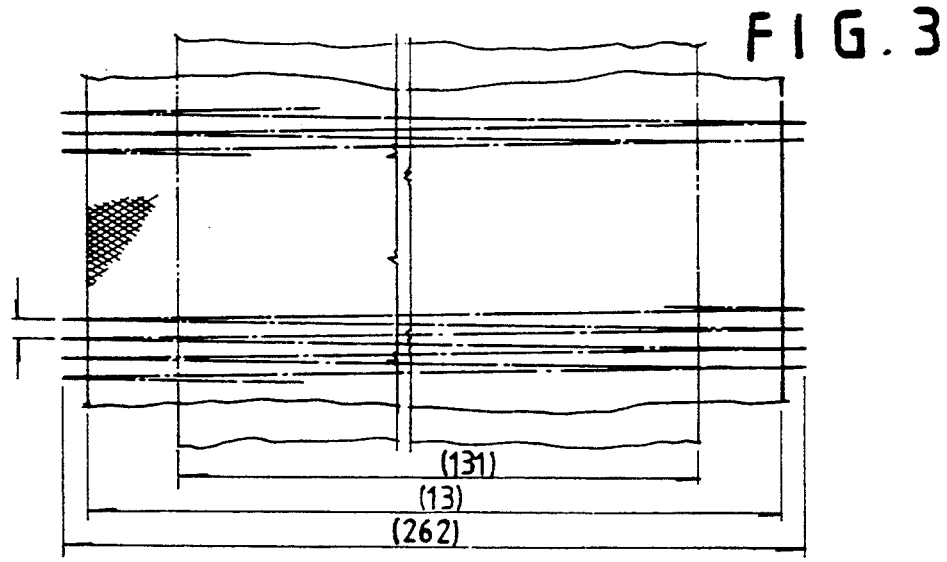
FIG. 3 is a diagram of spraying action of the nozzle in a cleaning and washing unit in the mud dehydrating system in the present invention.
Figure 10:
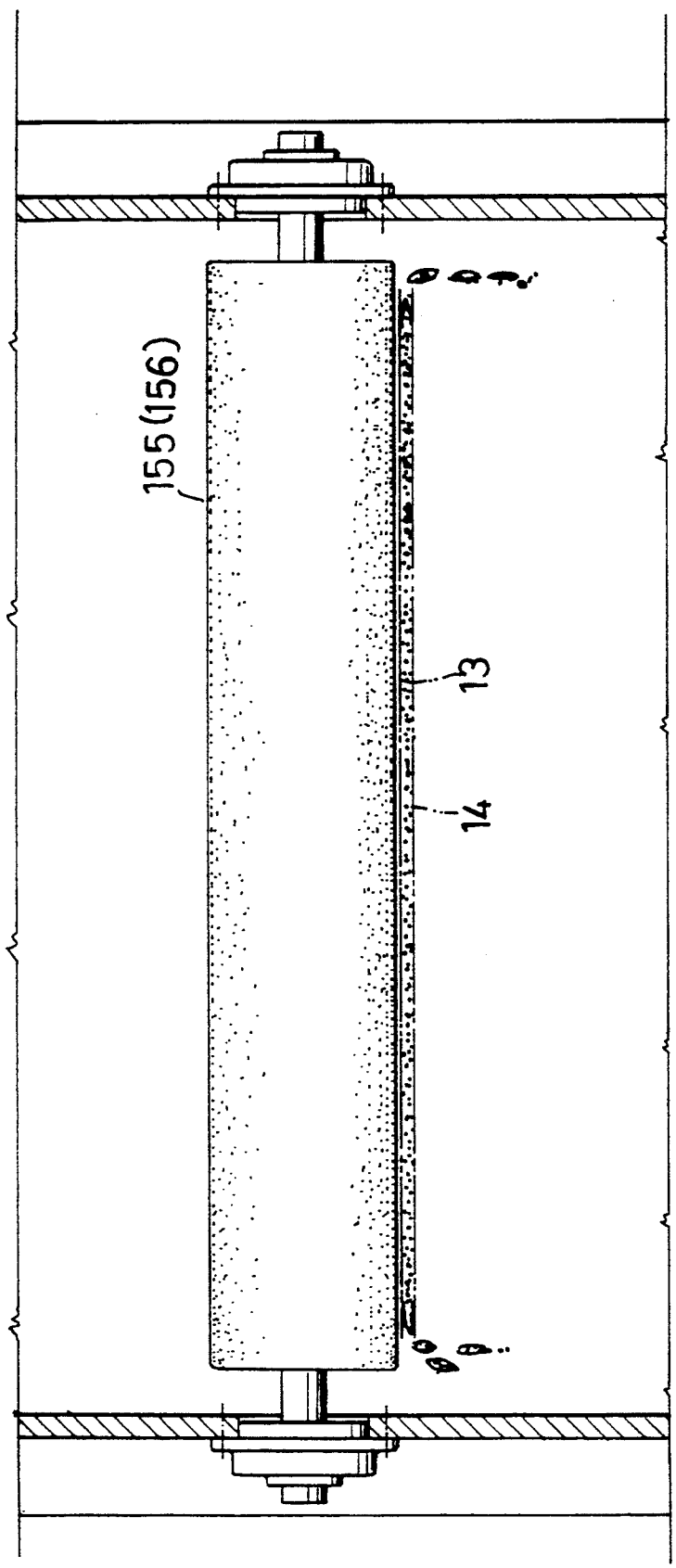
FIG. 10 is a front view of a first roller of compressing rollers and an upper and a lower filter cloth in the conventional mud dehydrating system.
Figure 11:
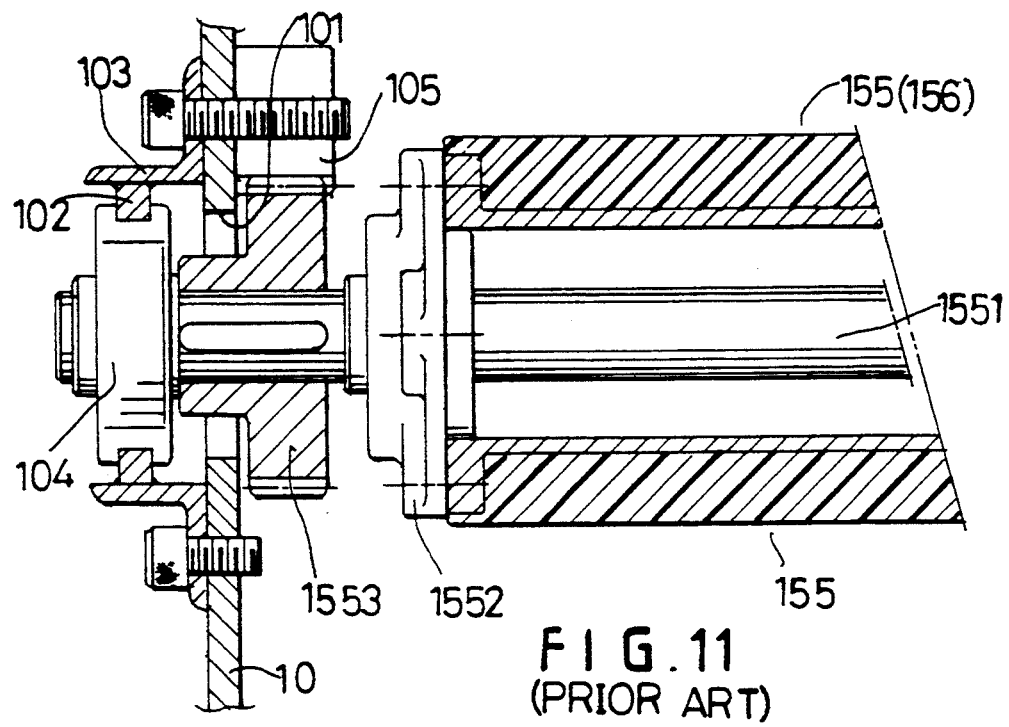
FIG. 11 is part cross-sectional view of a pressure augmenting unit of tension rollers in the conventional mud dehydrating system; and, FIG. 12 is an outer view of the pressure augmenting unit of the tension rollers in the conventional mud dehydrating system.
Figure 12:
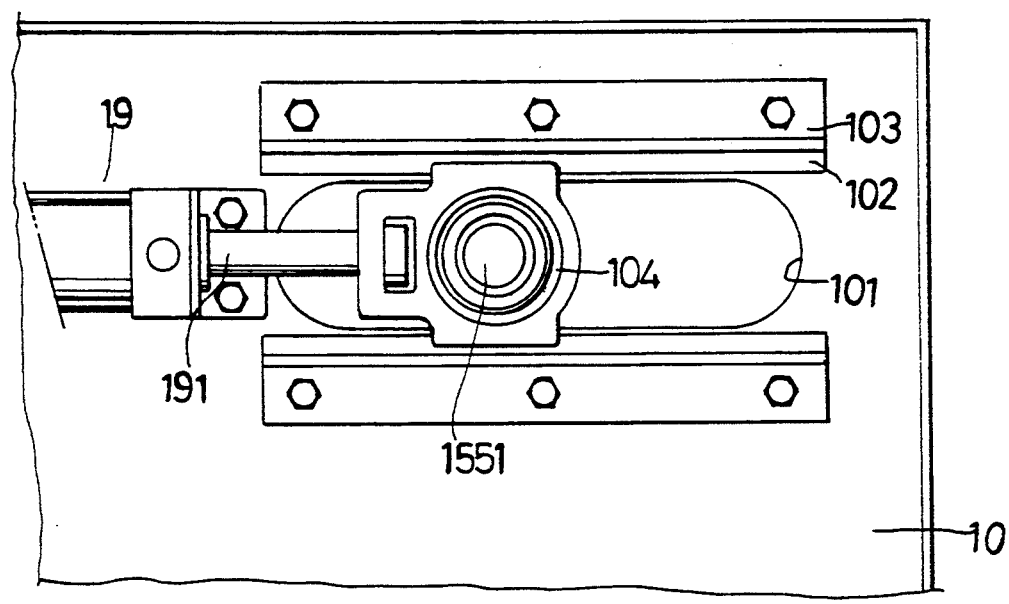

The endless circulating filter cloth 13 or 14 is moved a speed of 2000 mm/m, and the motor 22 has 2 poles and a speed of 3320 rpm which is reduced to 1/5 of that, i.e. 664 rpm. One rotation of the disc 23 makes the nozzle 26 move through one swinging operation. The nozzle 26 is therefore moved through 664 cycles of swinging per minute. As shown in FIG. 3, the moving width of the water stream 262, i.e. its sine curve is 2000/664=3, in other words, the distance of one cycle of the water stream (one pitch from a peak to next peak of the moving width) is 3 mm. And the width of the water string 262 is 1.5 mm and a main washing area 131 can be intensively shot by the water stream 262. The main washing area 131 on the filter cloth is less than 60 cm wide, and if the water stream shoots the cloth 13, it can spread to 0.3 mm around the shot point so that the working area includes almost all portions of the cloth 13 needed to be cleaned and washed.

The number of the nozzles 26 to be combined on the pivotal shaft 25 can be increased or decreased according to the size of the table 10 and the width of the filter cloth 13 or 14.

As can be seen from the above description, the cleaning and washing unit 2 in the present invention can produce a much better spraying and washing effect than the conventional one, having swinging nozzles combined with a high pressure pump. Besides, recycled compressed water can be used to reduce water consumption to as little as possible, improving operation over the large water consumption of the conventional system.

FIG. 4 shows the structure of the compressing roller unit 15 in this invention. Two front compressing rollers 3, 4 are provided having a comparatively long annular recess 31, 41, different from the other compressing rollers behind them.

After the mud mass passes over the second grid gravitational dehydrating section 18 into the space between the upper and the lower filter cloths 13, 14 between the two rollers 3, 4, it is gradually compressed and squeezed by the rollers 3, 4 to release water contained therein. As the rollers 3, 4 have annular recesses 31, 41, the filter cloths 13, 14 are pressed into the recesses 31, 41 and consequently the hollow space between the two cloths 13, 14 widens a little to contain more mud. Then the mud may not spill out of both sides of the cloths. the large mud mass entering the compressing roller unit 15 gradually releases its water, becoming rather thick mud blocks.

The compressing rollers 3, 4, provided with long annular recesses, cooperate with the highly elastic filter cloths 13, 14 and force the mud mass to move into the recesses and stay therein without leaking out of both sides of the cloths. The mud mass concentrates itself to increase its thickness to be sent to a further squeezing dehydrating section which follows, so as to receive high pressure. A highly effective shearing dehydrating process results to form mud blocks with the least amount of moisture, improving the drawbacks of the conventional cylindrical roller dehydrating process.

FIGS. 5 and 6 show a pressure augmenting unit 19 in the present invention, which includes two air cylinders 192 and 5 instead of one air cylinder 192 in the conventional mud dehydrating system, combined in series with each other and with a check valve 52. A second air cylinder 5 is provided with a piston 51 having no rods. The check valve 52 is fixed at the entrance of the first air cylinder 192, as shown in FIG. 6, and an oil tube 53 connected with a tube joint 54 fixed at an outlet of the second air cylinder 5. Another tube joint 55 is fixed at the entrance of the second air cylinder 5 and connected with a pressure tube 56 connected with a pressure source. The check valve 52 is connected with a tube 57 to release pressure from the exit of the second air cylinder 5. Incompressible oil is filled between the piston 51 and the exit of the second air cylinder 5.

In operating, compressed air coming from the air tube 56 flows into the second air cylinder 5, pushing the piston 51 forward, to the right side, forcing the oil therein to flow through the tube joint 54, the oil tube 53, the check valve 52 and into first air cylinder 192 to push forward its piston to move the tension roller 155 or 156 for pulling the filter cloth 13, or 14 tightly.

The check valve 52 has a function to check the oil entering the first air cylinder 192 unretractable and incompressible so that the tension roller 155 may not change its pushing force even if used for a long period of time. In case the roller 155 is wanted to be retreated, another pressure source is needed or the check valve 52 has to be forced to work, letting the oil in the first air cylinder 192 retreat.

While the preferred embodiments of the invention have been described above, it will be recognized and understood that various modifications may be made therein and the appended claims are intended to cover all such modifications which may fall within the spirit and scope of the invention.

What is claimed is:

1. A mud dehydrating apparatus for further dehydration of mud supplied from a centrifugal dehydrating cylinder, comprising:

a. an endless upper filter cloth extending between a first pair of longitudinally spaced rollers for receiving and transporting said mud from said centrifugal dehydrating cylinder in a first direction;

b. first means for gravitational dehydration disposed beneath a portion of said endless upper filter cloth;

c. an endless lower filter cloth extending between a second pair of longitudinally spaced rollers and being disposed in spaced vertical relation with respect to said endless upper filter cloth for receiving said mud therefrom, said endless lower filter cloth transporting said mud in a second direction, said second direction being opposite said first direction;

d. second means for gravitational dehydration disposed beneath a portion of said endless lower filter cloth;

e. compressing means for further dehydration of said mud subsequent to passage over said second means for gravitational dehydration, said compressing means including a series of compressing rollers between which said endless upper and lower filter cloths pass in substantially parallel spaced relation for compressing said mud therebetween, a first of said series of compressing rollers having an annular recess formed in a central portion thereof for receiving a portion of said endless upper filter cloth therein and defining an enlarged receiving space between said endless upper and lower filter cloths for said mud from said second means for gravitational dehydration, whereby leakage of said mud from between opposing sides of said spaced endless upper and lower filter cloths is substantially prevented;

f. means for removing dehydrated mud from said endless upper and lower filter cloths subsequent to said mud passing through said compressing means disposed adjacent a respective one of said rollers of each of said first and second pair of rollers;

g. means coupled to a respective one of each of said first and second pairs of rollers for respectively tensioning said endless upper and lower filter cloths; and, h. washing means disposed adjacent to said dehydrated mud removing means for washing each of said endless upper and lower filter cloths subsequent to removal of said dehydrated mud, said washing means including a pair of spraying means, each of said pair of spraying means being disposed adjacent a respective one of said endless upper and lower filter cloths, each of said spraying means including (1) a longitudinally directed hollow shaft supported by a bearing for pivotal displacement thereof, said hollow shaft having opposing first and second ends, (2) a connecting tube coupled in fluid communication with said hollow shaft and extending transversely from said first end of said hollow shaft, (3) a nozzle coupled to a distal end of said connecting tube and in fluid communication therewith for spraying a respective filter cloth with a water stream, (4) a rotatable fluid connector coupled to said second end of said hollow shaft and in fluid communication therewith for supplying pressurized water thereto, (5) a crank arm coupled to said hollow shaft adjacent said second end thereof, (6) a connecting rod member having first and second ball links disposed on opposing ends thereof, said first ball link being coupled to said crank arm, and (7) means for reciprocatingly displacing said crank arm coupled to said second ball link to cyclically swing said nozzle through a predetermined angular displacement.

2. A mud dehydrating apparatus for further dehydration of mud supplied from a centrifugal dehydrating cylinder, comprising:

a. an endless upper filter cloth extending between a first pair of longitudinally spaced rollers for receiving and transporting said mud from said centrifugal dehydrating cylinder in a first direction;

b. first means for gravitational dehydration disposed beneath a portion of said endless upper filter cloth;

c. an endless lower filter cloth extending between a second pair of longitudinally spaced rollers and being disposed in spaced vertical relation with respect to said endless upper filter cloth for receiving said mud therefrom, said endless lower filter cloth transporting said mud in a second direction, said second direction being opposite said first direction;

d. second means for gravitational dehydration disposed beneath a portion of said endless lower filter cloth;

e. compressing means for further dehydration of said mud subsequent to passage over said second means for gravitational dehydration, said compressing means including a series of compressing rollers between which said endless upper and lower filter cloths pass in substantially parallel spaced relation for compressing said mud therebetween, a first of said series of compressing rollers having an annular recess formed in a central portion thereof for receiving a portion of said endless upper filter cloth therein and defining an enlarged receiving space between said endless upper and lower filter cloths for said mud from said second means for gravitational dehydration, whereby leakage of said mud from between opposing sides of said spaced endless upper and lower filter cloths is substantially prevented;

f. means for removing dehydrated mud from said endless upper and lower filter cloths subsequent to said mud passing through said compressing means disposed adjacent a respective one of said rollers of each of said first and second pair of rollers;

g. means coupled to a respective one of each of said first and second pairs of rollers for respectively tensioning said endless upper and lower filter cloths, said tensioning means including a pair of means for displacing one roller of a respective one of said first and second pairs of rollers, each of said pair of roller displacing means including (1) a first air cylinder having a first piston and a piston rod extending from one side thereof, said piston rod having a distal end coupled to a respective roller for displacement thereof to tension a respective one of said endless upper and lower filter cloths, (2) a second air cylinder having a displaceable second piston and being devoid of a piston rod, said second air cylinder having an incompressible fluid on one side of said second piston and air on an opposing side thereof, said second piston being displaced in one direction by pressurized air applied to a first end of said second air cylinder, said displacement of said second piston displacing said incompressible fluid from a second end of said second cylinder, (3) a conduit having one end coupled in fluid communication with said second end of said second air cylinder for carrying said displaced incompressible fluid therefrom, and (4) a check valve having an inlet coupled to an opposing end of said conduit and an outlet coupled to one end of said first air cylinder for displacing said piston rod in at least one direction by said displaced incompressible fluid; and, h. washing means disposed adjacent to said dehydrated mud removing means for washing each of said endless upper and lower filter cloths subsequent to removal of said dehydrated mud.

* * * * *